//

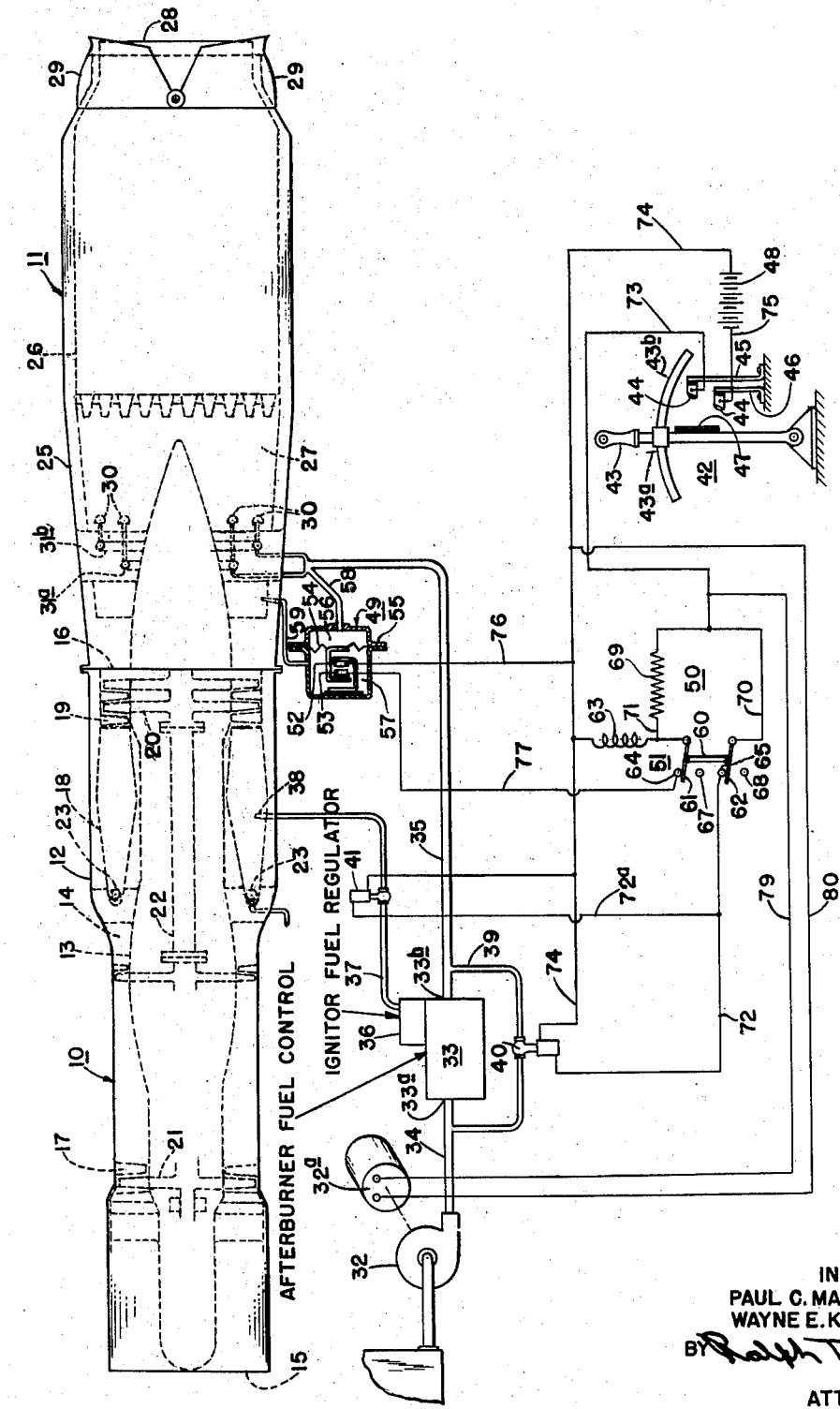

United States Patent Office 2,892,307
Patented June 30, 1959

2,892,307

"HOT STREAK" IGNITION ARRANGEMENT FOR AFTERBURNER FUEL CONTROL SYSTEM

Paul C. Mangan, Pittsburgh, Pa., and Wayne E. Kohman, Kansas City, Mo., assignors to Westinghouse Electric Corporation, East Pittsburgh, Pa., a corporation of Pennsylvania Application November 17, 1955, Serial No. 547,577

6 Claims. (Cl. 60—35.6)

This invention relates to gas turbine power plants, and more particularly to an aviation gas turbine power plant equipped with afterburner apparatus.

It has been proposed to provide an aviation turbojet engine with thrust augmentor or afterburner apparatus, which is adapted to be rendered operative under suitable conditions for burning additional fuel in the mixture of air and exhaust gases discharged from the turbine, thereby increasing the thrust energy available upon discharge of the motive fluid through the jet nozzle of the engine.

In Patent 2,640,316 of R. A. Neal, issued on June 2, 1953, and assigned to the assignee of the present invention, there is disclosed an improved ignition arrangement of the "hot streak" type for turbojet afterburners, wherein by means of an additional fuel nozzle provided in the main combustion section of the power plant, a transient excess quantity of fuel is admitted to said combustion chamber when operation of the afterburner is initiated. The excess fuel forms an incandescent mass of gases which is swept through the turbine into the afterburner for igniting the fuel issuing from the afterburner fuel manifolds.

On turbojet engines equipped with afterburners, the afterburner fuel metering control is preferably located adjacent the compressor, i.e. remotely from the main combustion apparatus and the afterburner, to avoid the effects of the high temperatures of combustion encountered therein. The length and volume of the fuel delivery conduits to the afterburner are substantial factors affecting the ignition cycle, especially since they are prone to drain during non-afterburning operation of the engine and must be re-filled before afterburner operation is effected. Because of the severe temperature conditions, it is also inadvisable to provide a shut-off valve in the fuel delivery conduit adjacent the afterburner manifolds to prevent fuel drainage.

The time required to fill the fuel conduits is proportional to the volume of the conduits and the rate at which fuel is admitted to the conduits and since the rate of fuel flow is inversely proportional to altitude, at high altitude and low rate of fuel flow the short duration ignition cycle may be completed before fuel issues from the afterburner manifolds, so that the afterburner is not ignited consistently.

The present invention is concerned with ignition apparatus of the above "hot streak" type for turbojet afterburners and has for an object to provide a simple yet effective arrangement in which fuel flow through the ignitor nozzle is delayed until the afterburner fuel manifolds are filled with fuel.

Another object of the invention is to provide a "hot streak" afterburner ignition system in which the initial flow of fuel to the afterburner fuel manifolds is momentarily accelerated to insure prompt filling of the fuel supply lines thereto, regardless of the flying altitude of the aircraft, and issue of fuel from the afterburner fuel nozzles in time for ignition by the transient incandescent mass of gases from the ignitor nozzle.

A further object is to provide, in apparatus of the above type, an arrangement wherein the initial accelerated flow of fuel to the afterburner manifolds is effected without disturbing the normal fuel metering operation of the afterburner fuel control.

In accordance with the invention, a normally closed valve is provided in a bypass conduit communicating with the fuel inlet and outlet of the afterburner fuel control and a normally open valve is provided in the conduit providing fuel to the "hot streak" ignitor nozzle disposed in the main combustion apparatus of the turbojet engine. The valves are controlled by the afterburner control lever and are arranged in such a manner that when the lever is moved to the "on" position the bypass valve is moved to the open position, thereby permitting full flow of fuel from the afterburner fuel pump to the afterburner manifolds, while the ignitor valve is concomitantly moved to the closed position thereby preventing issue of fuel from the ignitor nozzle into the main combustion apparatus. An override mechanism, responsive to predetermined rise in pressure of fuel in the afterburner manifold is provided to restore the valves to their normal condition when the afterburner manifolds and their supply conduit are filled with fuel, whereupon fuel from the ignitor nozzle is injected into the main combustion apparatus and is immediately effective to ignite the afterburner fuel. As the bypass valve closes, the afterburner control assumes metering control of the fuel supply to the afterburner manifolds. An electric lock-out circuit is further provided in conjunction with the override mechanism to prevent cycling at reduced manifold fuel pressure conditions during operation of the afterburner.

The above and the objects are effected by the invention as will be apparent from the following description taken in connection with the accompanying drawings, forming a part of this application, in which:

The single figure is a diagrammatic elevational view of a typical turbojet and afterburner apparatus, having embodied therein afterburner ignition equipment constructed in accordance with the invention.

Referring to the drawing in detail, there is shown a power plant comprising an axial flow turbojet engine 10 and afterburner apparatus 11, both of which have substantially cylindrical casing structures mounted in coaxial alignment and adapted to be supported in the fuselage or wing of an aircraft (not shown). The turbojet engine 10 includes an outer casing 12 and an inner core structure generally indicated at 13, which form an annular passageway 14 extending longitudinally through the engine from a forwardly directed air intake opening 15 to a rearwardly disposed turbine discharge passage 16. The operating elements of the turbojet engine include a compressor 17, an annular combustion chamber 18 and a turbine 19, the rotor 20 of which is connected to the rotor 21 of the compressor by a suitably journaled shaft 22.

In operation, air entering the intake opening 15 is pressurized by the compressor 17 and delivered to the combustion chamber 18, where fuel supplied by nozzles 23 is ignited to form hot motive fluid, which is expanded through the turbine 19 for driving the compressor and then supplied through the discharge passage 16 to the afterburner apparatus 11.

The afterburner apparatus 11 comprises a generally cylindrical outer casing 25, bolted or otherwise secured at its forward end to the rearmost section of the turbojet outer casing structure 12. Mounted in the casing 25 is a tubular combustor section 26 which provides the afterburner combustion chamber 27 communicating with the turbine discharge passage 16 and terminating in an exhaust outlet or nozzle 28. The flow area of the exhaust nozzle 28 may be controlled by suitable movable members 29. Suitable fuel nozzles 30 mounted on manifolds 31a, 31b are disposed in the combustion chamber. It will be understood that fuel supplied to the combustion chamber 27 by the nozzles 30 is burned in the heated gas and air mixture exhausted from the turbojet unit 10 to provide additional thrust energy for propelling the aircraft upon final discharge of the resulting motive fluid to atmosphere through the variable exhaust nozzle 28.

Any desired engine fuel control apparatus (not shown) may be utilized for supplying fuel to the annular combustion chamber 18 by way of the fuel nozzles 23 during operation of the power plant. In the schematic arrangement illustrated in the drawing, fuel is supplied to the afterburner 11 under control of apparatus comprising a centrifugal afterburner fuel pump 32 and a suitable afterburner fuel control mechanism 33 (not shown in detail since it forms no part of the invention) constructed and arranged to effect automatic regulation of the flow of fuel to the afterburner manifolds 31a and 31b. The afterburner fuel control mechanism has an inlet 33a which is connected to the fuel pump 32 by means of a supply conduit 34 and has an outlet 33b communicating with a delivery conduit 35 connected to the afterburner manifolds 31a and 31b. The afterburner fuel control mechanism 33 is provided with an igniting mechanism 36 for regulating fuel delivered through a conduit 37 to an ignitor nozzle 38 disposed in the main combustion chamber 18 of the turbojet. The ignitor mechanism 36 forms no part of the invention. However, it is of the type which is effective to discharge a measured amount of fuel to the ignitor nozzle 38 to initiate afterburner operation.

In accordance with the invention, a bypass conduit 39 is provided for communicating with the supply conduit 34 upstream of the afterburner fuel control and with the delivery conduit 35 downstream of the afterburner fuel control. A normally closed solenoid valve 40 is interposed in the bypass conduit 39. A normally open solenoid valve 41 is interposed in the supply conduit 37 to the ignitor nozzle. The fuel pump 32 may be actuated in any desirable manner, for example, by an electric motor 32a.

The afterburner fuel system described above is not used at all times, hence, there is provided a selectively operable switch 42 having a control lever 43 movable from an off position 43a to an on position 43b to initiate operation of the afterburner. The selectively operable switch 42 is provided with a pair of contacts 44 mounted upon flexible arms 45 and 46 and a bridging contact member 47 adapted to engage the contacts 44 to make a circuit therethrough. The switch 42, through its contacts 44 and 47, regulates operation of the bypass valve 40 and the ignitor valve 41 by means of an electrical circuit including a power supply 48, an override arrangement including a differential pressure sensing devide 49 hereafter to be described, and a locking circuit 50 including a relay 51.

The differential pressure sensing device 49 is provided with a stationary contact 52 and a movable contact 53 supported upon a diaphragm 54. The diaphragm 54 and the contacts 52 and 53 are confined within a housing 55 divided into a chamber 56 and a chamber 57 by the diaphragm 54. The chamber 56 is in communication with the manifolds 31a and 31b by way of a conduit 58. The chamber 57 is in communication with the gas pressure surrounding the manifolds by way of a conduit 59. The mechanism is so arranged that when the differential pressure across the diaphragm is below a selected value the contacts 52 and 53 are engaged with each other. However, when the fuel pressure drop across the manifolds 31a and 31b rises to a preselected value, the diaphragm will move to the left as viewed in the figure, to separate the contacts 52 and 53.

The relay 51 in the locking circuit 50 is provided with a movable armature 60 having a pair of contacts 61 and 62 movable conjointly therewith and actuated by an electrical coil 63. The armature 60 is arranged in such a manner that when the coil 63 is not energized the movable contacts 61 and 62 are in engagement with a pair of stationary contacts 64 and 65, respectively. When the coil 63 is energized, the armature 60 is movable to cause the contacts 61 and 62 to disengage the contacts 64 and 65, respectively, and to move into abutment with stops 67 and 68, respectively. The locking circuit 50 is further provided with a current-limiting resistor 69 connected at one end to the movable contact 62 by a conductor 70 and connected at its other end by a conductor 71 to a point intermediate the movable contact 61 and the coil 63.

The stationary relay contact 65 is connected to the bypass valve 40 by means of a conductor 72, and to the igniter valve 41 by means of a conductor 72a, while the switch contact 44 is connected to the conductor 70 of the locking circuit by means of a conductor 73, thereby establishing a circuit to the valves 40 and 41 which is controlled by the locking circuit 50. The valves 40 and 41 are connected to the power supply 48 by means of a return conductor 74 and the power supply 48 is in turn connected to the other selector switch contact 44 by means of a conductor 75. Thus, it will be seen that the valves 40 and 41 are disposed in parallel with each other and are operated conjointly under conditions which will subsequently be described.

The pressure responsive device 49 is connected into the electrical circuit by means of a conductor 76 extending from the stationary contact 52 to the conductor 74 and by means of a conductor 77 extending from the movable contact 53 to the stationary relay contact 64.

The motor 32a may be operated in any desirable manner. However, as shown it is connected directly across the selector switch contacts 44 by means of a pair of conductors 79 and 80, so that it is under the direct control of the selector switch.

In operation, when it is desired to initiate operation of the afterburner, the control lever 43 is moved to the right from the position illustrated to position 43b, whereupon the contacts 44 are abutted by the bridging contact 47, thereby making the circuit through conductors 79 and 80 to the motor 32a to initiate operation of the pump 32, and concomitantly completing a circuit through conductors 73 and 70, relay contacts 62 and 65, parallel conductors 72 and 72a through valves 40 and 41, respectively, and conductor 74, thereby energizing the bypass valve 40 to its open position and the ignitor valve 41 to its off position. Since the contacts 52 and 53 are in engagement at this time, a circuit through the differential pressure sensing device is completed through resistor 69, relay contacts 61 and 64, and conductors 77 and 76, thereby shunting the relay coil 63 so that it remains in an unenergized state.

Under the above conditions, fuel is delivered by the fuel pump 32 to the afterburner fuel control 33 which regulates the fuel delivery to the manifolds 31a and 31b through conduit 35. Concurrently therewith, fuel is delivered to the conduit 35 through the bypass conduit 39 in relatively large amounts so that within a relatively short time, on the order of a few seconds, the conduit 35 and the manifolds 31a and 31b are filled with fuel. When the fuel in the manifolds attains a preselected pressure value, the diaphragm 54 of the differential pressure sensing mechanism 49 is deflected to the left from the position shown, thereby separating the contacts 52 and 53 and interrupting the electrical circuit through the conductors 76 and 77, whereupon energization of the actuating coil 63 of the relay is initiated, causing the relay contacts 61 and 62 to move out of engagement with the contacts 64 and 65, respectively, and into abutment with the stops 67 and 68, respectively. The circuit through the valves 40 and 41 is thus interrupted at the relay contacts 62 and 65, whereupon the valves are de-energized and restored to their original positions. The solenoid valve 40 thereupon interrupts flow of fuel through the bypass conduit 39, so that all fuel delivered thereafter to the afterburner fuel manifolds must pass through the afterburner fuel control 33 and is regulated thereby. The solenoid valve 41, upon opening permits flow of the fuel from the igniting mechanism 36 to the ignitor nozzle 38, whereupon fuel is injected thereby into the combustion chamber 18 and is ignited therein and delivered downstream through the turbine 19 as an incandescent mass of gases which serve to ignite the fuel issuing from the afterburner nozzles 30. The mechanism 36 after delivering a measured amount of fuel to the ignitor nozzle 38 will thereupon interrupt such flow to the ignitor nozzle. However, since the timing between the fuel flow from the afterburner fuel nozzles 30 and the ignitor nozzle 38 is interlocked in the manner described above, ignition of the afterburner is assured without the possibility of misfiring, as might be the situation, if the fuel issuing from the ignitor nozzle 38 were not timed to the existence of an adequate quantity of fuel within the afterburner manifolds.

Since the pressure sensing device 49 is now locked out or disconnected from the electrical circuit at the relay 51 of the locking circuit, any subsequent re-engagement of its contacts 52 and 53, due to reduced differential pressure such as may be incurred at high altitude operation of the afterburner, has no effect on the afterburner control circuit.

To terminate afterburner operation, the selector lever 43 is moved to the left to the position illustrated, whereupon the contacts 44 and 47 are disengaged, thereby interrupting the circuit to the motor 32a and causing the flow of fuel from the pump 32 into the afterburner fuel control 33 to cease, whereupon combustion in the afterburner 11 will soon after terminate. Also, the relay coil 63 is deenergized, causing the relay contacts 61 and 62 to be restored to their initial position.

It will now be seen that the invention provides an afterburner fuel system in which the firing of the fuel in the afterburner fuel nozzles is initiated by the existence of fuel in the manifolds in sufficient amount to assure issuance therefrom through the nozzles, and that the differential pressure sensing device 49 serves to initiate the flow of fuel to the ignitor nozzle when the preselected pressure value of fuel within the manifolds is attained.

It will also be seen that with the bypass and valve arrangement therefor, the delay between selection of the afterburner fuel interval and the initiation of afterburning is reduced; since the conduit 35 and the fuel manifolds are filled more rapidly than would otherwise be possible, if the flow thereto were delivered entirely by the afterburner fuel control. This is a desirable feature since, due to the high temperatures prevailing in the afterburner 11 and the main combustion chamber 18, it is desirable to mount the afterburner fuel control upstream of the main combustion chamber for the sake of safety, proper performance and long life. Such an arrangement necessitates the utilization of a long conduit (conduit 35) leading from the afterburner fuel control 33 to the afterburner fuel manifolds 31a and 31b.

A further advantage of the invention is its high reliability. If for any reason, the bypass valve 40, the ignitor valve 41 and/or the differential pressure sensing device 49 should fail to function, the system will not be rendered inoperative; since the conduit 35 will be filled by metered fuel from the afterburner control 33 and the ignitor nozzle 38 will inject fuel under the sole control of the igniting mechanism 36.

The locking circuit 50 permits the differential pressure sensing device 49 to be set to function at relatively high values for example on the order of 50 p.s.i., thereby lending to its ruggedness and reliability, without the possibility of inadvertently re-initiating the ignition cycle at lower pressure differential such as may be incurred in afterburner operation at high altitudes.

While the invention has been shown in but one form, it will be obvious to those skilled in the art that it is not so limited, but is susceptible of various changes and modifications without departing from the spirit thereof.

What is claimed is:

1. In a gas turbine power plant having combustion apparatus normally operative for supplying hot motive fluid to the turbine; an afterburner for receiving fluid exhausted from said turbine, said afterburner having a manifold; means including a pump and fuel control means for supplying fuel to said afterburner fuel manifold; and ignition means including a fuel nozzle operative upon operation of said fuel control means to inject a predetermined excess quantity of combustible matter into said combustion apparatus, whereby an incandescent mass is momentarily carried thorugh said turbine into said afterburner for igniting the fuel issuing from said manifold: the combination comprising a supply conduit communicating with said fuel nozzle; a normally open valve in said conduit, selectively operable means for moving said valve to its closed position, and override means responsive to a predetermined fuel pressure in said afterburner fuel manifold for restoring said valve to its normal position.

2. In a gas turbine power plant having combustion apparatus normally operative for supplying hot motive fluid to the turbine; an afterburner for receiving fluid exhausted from said turbine, said afterburner having a manifold; means including a pump and fuel control means for supplying fuel to said afterburner fuel manifold; and ignition means including a fuel nozzle operative upon operation of said fuel control means to inject a predetermined excess quantity of combustible matter into said combustion apparatus, whereby an incandescent mass is momentarily carried through said turbine into said afterburner for igniting the fuel issuing from said manifold: the combination comprising a bypass conduit in communication with the fuel inlet and outlet of said fuel control means, a normally closed valve in said bypass conduit, selectively operable means for concomitantly initiating operation of said pump and moving said valve to its open position, and override means responsive to a predetermined fuel pressure in said afterburner fuel manifold for restoring said valve to its normal position.

3. In a gas turbine power plant having combustion apparatus normally operative for supplying hot motive fluid to the turbine; an afterburner for receiving fluid exhausted from said turbine, said afterburner having a manifold; means including a pump and fuel control means for supplying fuel to said afterburner fuel manifold; and ignition means including a fuel nozzle operative upon operation of said fuel control means to inject a predetermined excess quantity of combustible matter into said combustion apparatus, whereby an incandescent mass is momentarily carried through said turbine into said afterburner for igniting the fuel issuing from said manifold: the combination comprising a bypass conduit in communication with the fuel inlet and the outlet of said fuel control means, a normally closed valve in said bypass conduit, a normally open valve in said ignition means, selectively operable means for concomitantly moving said normally closed valve to its open position and said normally open valve to its closed position, and override means responsive to a predetermined fuel pressure in said afterburner fuel manifold for restoring said valves to their normal positions.

4. The structure recited in claim 3 and further including lock-out means for rendering said override means subsequently ineffective to reactuate said valves regardless of manifold fuel pressure.

5. In a gas turbine power plant having combustion apparatus normally operative for supplying hot motive fluid to the turbine; an afterburner for receiving fluid exhausted from said turbine, said afterburner having a manifold; means including a pump and fuel control means for supplying fuel to said afterburner fuel manifold; and ignition means including a fuel nozzle operative upon operation of said fuel control means to inject a predetermined excess quantity of combustible matter into said aftercombustion apparatus, whereby an incandescent mass is momentarily carried through said turbine into said afterburner for igniting the fuel issuing from said manifold: the combination comprising a fuel conduit connecting said pump directly with said fuel manifold, a normally closed electric valve in said conduit, an electric supply source, a selectively operable switch for initiating an electrical circuit from said supply source to said electric valve, whereby said electric valve is moved to its open position, override mechanism including a pair of contacts separable in response to a predetermined fuel pressure in said afterburner fuel manifold; and electrical lockout means including a relay having a set of separable contacts and an actuating coil therefor disposed in shunt with said override mechanism contacts, said override mechanism contacts being disposed in series with said relay contacts, whereby after said override mechanism contacts are initially separated in response to said predetermined manifold fuel pressure, said relay contacts are actuated to the open position to prevent re-energization of said valve.

6. In a gas turbine power plant having combustion apparatus normally operative for supplying hot motive fluid to the turbine; an afterburner for receiving fluid exhausted from said turbine, said afterburner having a manifold; means including a pump and fuel control means for supplying fuel to said afterburner fuel manifold; and ignition means including a fuel nozzle operative upon operation of said fuel control means to inject a predetermined excess quantity of combustible matter into said combustion apparatus, whereby an incandescent mass is momentarily carried through said turbine into said afterburner for igniting the fuel issuing from said manifold: the combination comprising a fuel conduit connecting said pump directly with said fuel manifold; a normally closed electric valve in said conduit; a normally open electric valve in said ignition means; a selectively operable switch having a set of contacts movable to a closed position for concomitantly initiating an electric circuit through said pump and said valves, whereby said pump is energized, said normally closed valve is moved to its open position and said normally open valve is moved to its closed position; override means including a pair of normally closed contacts and means responsive to a predetermined fuel pressure valve in said afterburner manifold for separating said override contacts; and electrical lockout means interposed between said override means and said valves including a relay having a set of separable contacts and an actuating coil therefor, said relay contacts controlling the circuit through said valves and being separable in response to said predetermined manifold pressure value to interrupt energization of said valves and prevent re-energization thereof regardless of subsequent manifold pressure values.

References Cited in the file of this patent
UNITED STATES PATENTS

| | | |
|---|---|---|
| 2,640,316 | Neal | June 2, 1953 |
| 2,736,166 | Mock | Feb. 28, 1956 |